US007941546B2

(12) United States Patent
Rice et al.

(10) Patent No.: US 7,941,546 B2
(45) Date of Patent: May 10, 2011

(54) CROSS-DOMAIN COMMUNICATION TECHNIQUE FOR EXECUTION OF WEB MASHUPS

(75) Inventors: Timothy S. Rice, Bellevue, WA (US); Andrew R. Sterland, Seattle, WA (US); Patrick Chi Wai Wong, Bellevue, WA (US); Adam D. Nathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 218 days.

(21) Appl. No.: 12/273,516

(22) Filed: Nov. 18, 2008

(65) Prior Publication Data

US 2010/0125623 A1 May 20, 2010

(51) Int. Cl.
*G06F 15/16* (2006.01)
(52) U.S. Cl. ........ 709/227; 709/203; 709/217; 709/218; 709/219; 709/226; 709/229
(58) Field of Classification Search ................... 709/203, 709/217, 218, 219, 226, 229, 227
See application file for complete search history.

(56) References Cited

U.S. PATENT DOCUMENTS

| 7,350,188 B2 | 3/2008 | Schulz |
| 2006/0212857 A1 | 9/2006 | Neumann et al. |
| 2007/0186007 A1 | 8/2007 | Field et al. |
| 2007/0239600 A1 | 10/2007 | Lundberg et al. |
| 2007/0250335 A1 | 10/2007 | Hodges et al. |
| 2007/0297755 A1 | 12/2007 | Holt et al. |
| 2008/0120596 A1 | 5/2008 | Kothari et al. |
| 2008/0172632 A1 | 7/2008 | Stambaugh |
| 2008/0183538 A1 | 7/2008 | Hamadi et al. |
| 2008/0201715 A1 | 8/2008 | Breiter et al. |
| 2008/0288624 A1* | 11/2008 | Armangil ........ 709/223 |
| 2008/0320381 A1* | 12/2008 | Sercel ........ 715/234 |
| 2009/0248855 A1* | 10/2009 | Nastacio ........ 709/224 |
| 2009/0265760 A1* | 10/2009 | Zhu et al. ........ 726/3 |
| 2009/0276835 A1* | 11/2009 | Jackson et al. ........ 726/4 |

OTHER PUBLICATIONS

Ben-Natan, Ron, "XML Glue: An XML Workflow and Integration Layer for Telecommunication Providers", Retrieved at <<http://xml.sys-con.com/node/40356>>, Feb. 22, 2002, pp. 5.
Beletski, Oleg, "End User Mashup Programming Environments", Retrieved at <<http://www.tml.tkk.fi/Opinnot/T-111.550/2008/End%20User%20Mashup%20Programming%20Environments_p.pdf>>, Apr. 11, 2008, pp. 14.
"Presto 2.0 The Enterprise Mashup Platform", Retrieved at <<http://www.jackbe.com/downloads.presto_20_datasheet.pdf>>, pp. 4.

(Continued)

*Primary Examiner* — Liangche A Wang

(57) ABSTRACT

A system and method is described for communicating requests from a Web mashup being executed within the context of a Web browser to third-party Web services in a manner that does not violate the Same Origin Policy (SOP) observed by many Web browsers. In one embodiment, a workflow engine operating in the context of a Web browser executes a plurality of executable components comprising a Web mashup. The workflow engine transparently redirects Web service requests generated by the executing components to a proxy server that acts as an intermediate between the workflow engine and third-party Web services. The proxy server, which is not subject to SOP, transmits the Web service requests to the third-party Web service and obtains requested data therefrom. The proxy server further returns the requested data in a manner that is useable by the Web mashup components.

20 Claims, 8 Drawing Sheets

OTHER PUBLICATIONS

"Skelta Announces Availability of Skelta Workflow.NET 2004", Retrieved at <<http://www.skelta.com/company/2004/skelta-workflow-2004.aspx>>, Nov. 15, 2004, p. 1.

Jhingran, et al., "Enterprise Information Mashups: Integrating Information, Simply", Retrieved at <<http://www.vldb.org/conf/2006/p3-jhingran.pdf>>, VLDB '06, Sep. 12-15, 2006, Seoul, Korea, pp. 3-4.

Maximilien, et al., "Swashup: Situational Web Applications Mashups", Retrieved at <<http://maximilien.org/publications/papers/2007/Maximilien+Ranabahu+Tai07.pdf>>, OOPSLA'07, Oct. 21-25, 2007, Montreal, Quebec, Canada, pp. 2.

"From Business Need to business Mashup in Three Simple Steps", Retrieved at <<http://www.serena.com/mashups/docs/3-steps-to-business-mashups-brief.pdf>>, pp. 1-6.

Jackson, et al., "Subspace: Secure Cross Domain Communication for Web Mashups", Retrieved at <<http://research.microsoft.com/~helenw/papers/subspace.pdf?0sr=ar>>, WWW, May 8-12, 2007, Banff, Alberta, Canada, pp. 10.

Ennals, et al., "MashMaker: Mashups for the Masses", Retrieved at <<http://berkeley.intel-research.net/rennals/pubs/sigmod035d-ennals.pdf>>, SIGMOD, 2007, Jun. 11-14, 2007, Beijing, China, pp. 3.

Altinel, et al., "Damia—A Data Mashup Fabric for Intranet Applications", Retrieved at <<http://www.vldb.org/conf/2007/papers/demo/p1370-altinel.pdf>>, VLDB 2007, Sep. 23-28, 2007, Vienna, Austria, pp. 1370-1373.

\* cited by examiner

CROSS-DOMAIN COMMUNICATION TECHNIQUE FOR EXECUTION OF WEB MASHUPS

BACKGROUND

In Web development, the term "Web mashup" is often used to describe a Web application that combines content from multiple sources to provide a new and distinct service to a user. Content used in mashups is often sourced from third party Web services via an application programming interface (API) or other interface. The entities involved in executing a mashup typically include: (1) content providers, such as third-party Web service providers, that make content available; (2) a Web site ("the mashup site") that facilitates access to a mashup that combines content obtained from the third-party Web service providers; and (3) a client Web browser that acts as a user interface to the mashup and that may actually execute the mashup using a client-side Web language such as JavaScript. Web mashups are also sometimes referred to as Web application hybrids.

It is desirable to be able to embed Web mashups in a variety of different Web pages located in a variety of different Internet domains. For example, users may wish to embed Web mashups developed by themselves or others into personal Web pages published via social networking Web sites, blogs, or other Web pages, thereby adding creativity and functionality to those Web pages. Ideally, a Web mashup should be capable of execution within the context of a Web page such that the Web mashup can directly interact with other elements on the Web page and vice versa, thereby allowing Web mashup data and functionality to be closely incorporated in the Web page.

One obstacle to embedding Web mashups in Web pages in this manner is that the retrieval of content by the mashup from third-party Web services will be hindered by a basic Web browser security model referred to as Same Origin Policy (SOP). SOP is used in most modern Web browsers that support client-side scripting. SOP operates to prevent a Web site from requesting data from any origin other than the origin from which the site was served. The term "origin" refers to a domain name, protocol and port. Two Web pages belong to the same origin if and only if these three values are the same.

This obstacle may be avoided if the third-party Web service uses either JSONP (JavaScript Object Notation with Padding) or certain application-specific policy files to serve up content. In this case, an agreement contract for cross-domain serving exists that will not violate SOP. However, many third-party Web service providers do not service Web requests in this fashion and thus another solution is required.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method is described herein for communicating requests from a Web mashup being executed within the context of a Web browser to a third-party Web service in a manner that does not violate a Same Origin Policy observed by the Web browser. In accordance with the method, a first Web service request to the third-party Web service generated by the Web mashup is received in a workflow engine running in the context of the Web browser. Responsive to receiving the first Web service request, the workflow engine generates a cross-domain call, such as a JavaScript Object Notation with Padding (JSONP) cross-domain call, to a proxy server and issues the cross-domain call to the proxy server. The cross-domain call includes information to be used by the proxy server in placing a second Web service request to the third-party Web service. The workflow engine then receives a callback from the proxy server that includes content returned from the third-party Web service responsive to the placement of the second Web service request by the proxy server. The workflow engine then processes the callback to deliver the content returned from the third-party Web service to the Web mashup.

A computer program product is also described herein. The computer program product comprises a computer-readable medium having computer program logic recorded thereon for enabling a processing unit to communicate requests from a Web mashup being executed within the context of a Web browser to a third-party Web service in a manner that does not violate a Same Origin Policy observed by the Web browser. The computer program logic includes first means, second means, third means and fourth means. The first means are for enabling the processing unit to receive a first Web service request to the third-party Web service generated by the Web mashup. The second means are for enabling the processing unit to generate a cross-domain call, such as a JSONP cross-domain call, to a proxy server, wherein the cross-domain call includes information to be used by the proxy server in placing a second Web service request to the third-party Web service, and to issue the cross-domain call to the proxy server responsive to receiving the first Web service request. The third means are for enabling the processing unit to receive a callback from the proxy server that includes content returned from the third-party Web service responsive to the placement of the second Web service request by the proxy server. The fourth means are for enabling the processing unit to process the callback to deliver the content returned from the third-party Web service to the Web mashup.

A further method is described herein for communicating requests from a Web mashup being executed within the context of a Web browser to a third-party Web service in a manner that does not violate a Same Origin Policy observed by the Web browser. In accordance with the method, a cross-domain call from a workflow engine running in the context of the Web browser, such as a JSONP cross-domain call, is received in a proxy server, wherein the cross-domain call was issued by the workflow engine responsive to receiving a first Web service request generated by the Web mashup. Responsive to receiving the cross-domain call, the proxy server generates a second Web service request to the third-party Web server based on information included within the cross-domain call and places the second Web service request to the third-party Web service. The proxy server then receives content returned from the third-party Web service responsive to the placement of the second Web service request. The proxy server then return to the workflow engine a callback that includes the content returned from the third-party Web service.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
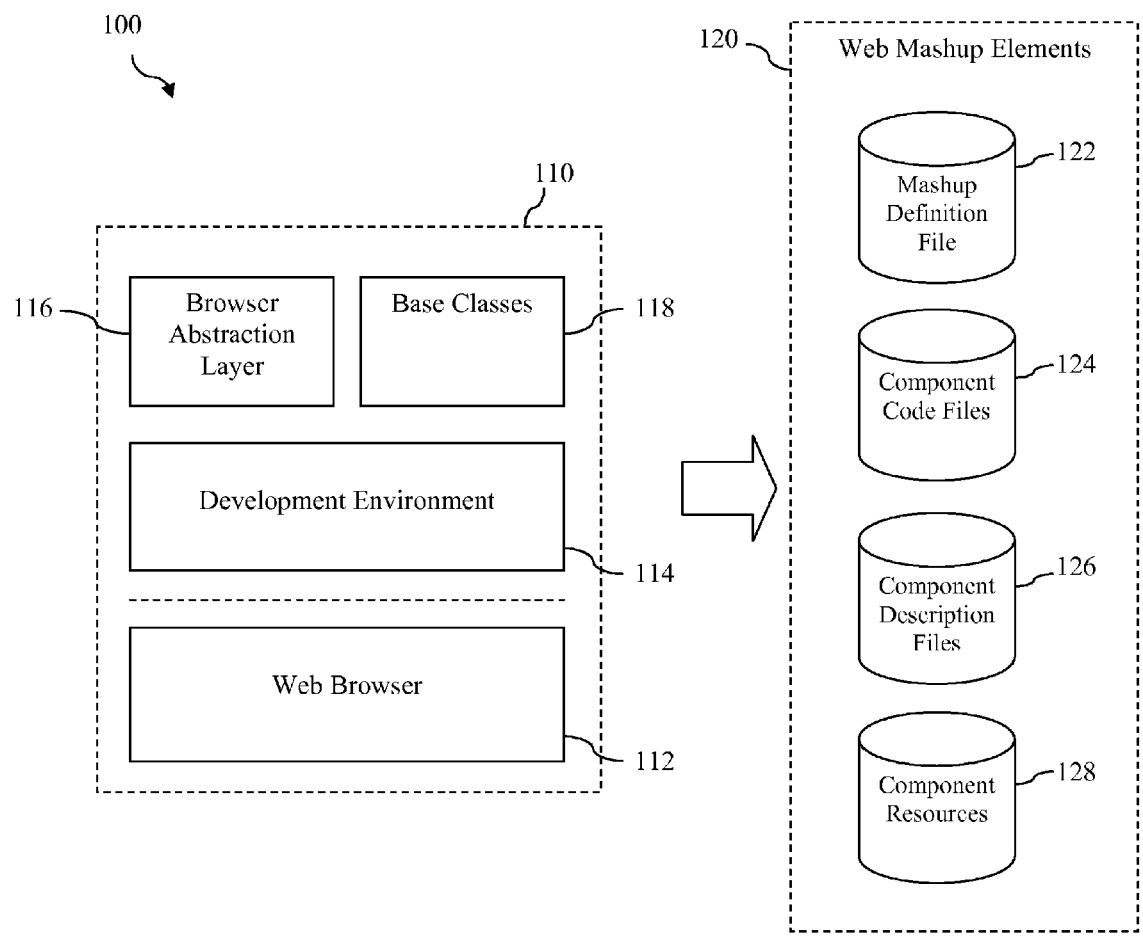
FIG. 1 is a block diagram of an example system for developing a Web mashup.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

An embodiment of the present invention facilitates the embedding of Web mashups in a variety of different Web pages located in a variety of different Internet domains. For example, an embodiment of the present invention may enable a user to embed Web mashups developed by themselves or others into personal Web pages published via social networking Web sites, blogs, or other Web pages, thereby adding creativity and functionality to those Web pages. So embedded, a Web mashup can advantageously be executed within the context of a Web page such that the Web mashup can directly interact with other elements on the Web page and vice versa. This allows Web mashup data and functionality to be closely incorporated in the Web page.

An embodiment of the present invention facilitates the foregoing by communicating requests from a Web mashup being executed within the context of a Web browser to third-party Web services in a manner that does not violate the Same Origin Policy (SOP) observed by many Web browsers. In particular, a workflow engine in accordance with an embodiment of the present invention executes in the context of a Web browser. The workflow engine executes a plurality of executable components comprising a Web mashup. The workflow engine transparently redirects Web service requests generated by the executing components to a proxy server that acts as an intermediate between the workflow engine and third-party Web services. The proxy server, which is not subject to SOP, transmits the Web service requests to the third-party Web service and obtains requested data therefrom. The proxy server further returns the requested data in a manner that is useable by the Web mashup components.

In one embodiment, the proxy server receives Web service requests from the workflow engine and returns requested data in accordance with the JSONP (Javascript Object Notation with Padding) methodology for cross-domain data fetching. In a further embodiment, the proxy server returns requested data as an argument of a callback function to a Web mashup component which is then executed by the workflow engine.

Although embodiments of the present invention are described herein as being applicable to the execution of Web mashups, persons skilled in the relevant art(s) will readily appreciate that the systems and methods described herein can generally be applied to any application or service that executes within the context of a Web browser and that generates cross-domain calls to other applications or services.

To facilitate a better understanding of the present invention, a description of one embodiment of the aforementioned workflow engine is provided below in Section B. Section C then describes a cross-domain communication technique used by an embodiment of the present invention to fetch data from third-party Web services for use by a Web mashup. Section D describes an example computer system that may be used to implement various features of the present invention and Section E provides some concluding comments.

B. Example Workflow Engine for Execution of Web Mashups

A software-implemented workflow engine is described in this section that executes a Web mashup within the context of a Web browser running on a client computer. The workflow engine is configured to parse a Web mashup definition obtained from a remote server to identify distinct units of execution within the Web mashup, referred to herein as components. The workflow engine is further configured to obtain programming logic and metadata associated with each type of component identified in the Web mashup definition from the remote server and to use such information to generate executable versions of the identified components. Finally, the workflow engine is configured to run each of the executable components, thereby executing the Web mashup.

As will be described in more detail herein, the workflow engine is advantageously configured to manage the order of execution of each of the executable components so that the Web mashup runs in an optimized and reliable fashion. For example, the workflow engine can initiate multiple executable components asynchronously, while also managing the execution sequence to ensure that content dependencies between the executable components are properly resolved. The workflow engine can also run certain executable components in an incremental fashion such that input to those executable components can be processed as soon as it becomes available.

1. Example Web Mashup Development Environment

An embodiment of a workflow engine that executes a Web mashup within the context of a Web browser running on a client computer will be described herein. However, before this embodiment is described, one manner in which such a Web mashup may be developed will first be described in reference to FIG. 1. In particular, FIG. 1 is a block diagram of an example system 100 for developing a Web mashup that includes a Web browser 112 executing on a client computer 110 and a development environment 114 hosted within Web browser 112.

Web browser 112 comprises a software application that enables a user to display content and interact with applications that are accessible via the Internet or some other network. Web browser 112 may comprise, for example, any commercially-available or publicly-available Web browser, including but not limited Internet Explorer® (published by Microsoft Corporation of Redmond, Wash.), Mozilla® Firefox® (published by Mozilla Corporation of Mountainview, Calif.), or Safari® (published by Apple Computer of Cupertino, Calif.). However, these examples are not intended to be limiting. Client computer 110 may comprise a personal computer or any other processor-based system or device capable of running a Web browser.

Development environment 114 represents programming logic that has been downloaded from a remote server by Web browser 112 for execution within the context of Web browser 112. When executed, development environment 114 provides a means by which a user can create, edit, run and save Web mashups via Web browser 112. In one embodiment, development environment 114 comprises programming logic developed by Microsoft Corporation of Redmond, Wash., and made accessible to users via the Microsoft® Popfly™ Website (http://www.popfly.com), although the invention is not so limited.

In an embodiment, development environment 114 allows a user to create a Web mashup by selectively combining distinct units of execution referred to herein as components. For example, a user may combine components by interacting with graphic representations of the components (e.g., icons) within the context of a graphical user interface (GUI) provided by development environment 114. Interacting with the graphic representations of the components may comprise, for example, placing graphic representations of the components onto a design surface of the GUI and selectively connecting input and output nodes associated with the graphic representations so placed. The connection of the output node of a first component to the input node of a second component may be used to indicate that one or more values output from the first component should be provided as an input to the second component.

A component may comprise, for example, a call to a third party Web service as well as wrapper logic for managing the manner in which the Web service is called and for properly formatting data returned therefrom. A component may alternatively comprise data processing logic or logic for displaying mashup results to a user such as via a GUI.

Depending upon the implementation, development environment 114 may allow the user to select from among a plurality of basic component types, wherein each component type is represented by a default component having certain default settings or parameters. The user may then customize the default component to generate a customized component by, for example, selectively altering the default settings or parameters. Altering the default settings or parameters may include, for example, specifying or modifying an operation to be performed by a component, specifying or modifying one or more values to be input to a component wherein such values may be provided from another component or specified by the user, or specifying or modifying one or more properties relating to how output is to be presented by a component. A single basic component type can thus be used to create a plurality of customized components within a mashup.

As further shown in FIG. 1, system 100 also includes a browser abstraction layer 116 and base classes 118. Browser abstraction layer 116 comprises programming logic that interprets function calls generated by development environment 114 such that the function calls are received in a format that is suitable for execution by Web browser 112. This ensures that development environment 114 will operate in a consistent and reliable manner across a variety of different Web browser types and also makes development easier by not requiring a developer to be concerned with Web-browser-specific implementation details. Base classes 118 comprise functions that may be called by development environment 114 to perform certain useful operations such as, for example, making Web requests or processing strings or arrays.

In addition to certain functions described above, development environment 114 further allows a user to save a Web mashup after it has been created or updated. The Web mashup may be saved, for example, to a remote server for subsequent access by the user or other users. As further shown in FIG. 1, a saved Web mashup comprises a number of different elements 120. Elements 120 include a mashup definition file 122, component code files 124 and component description files 126. Elements 120 may also optionally include component resources 128.

Mashup definition file 122 is a file that includes information that identifies each of the components that comprise the mashup. Mashup definition file 122 may also include additional information associated with each identified component, including for example, an operation to be performed by a component, one or more values to be input to a component, one or more properties relating to how output is to be presented by a component, and information indicating whether one or more values output from a component should be used as an input to another component. In one embodiment, the information in mashup definition file 122 is formatted in accordance with a markup language such as XML (Extensible Markup Language), although this is only an example.

Component code files 124 comprise files that include actual programming logic used to execute each type of component included within the Web mashup. In one embodiment, the programming logic is implemented using a scripting language such as JavaScript, although this example is not intended to be limiting.

Component description files 126 comprise files that include metadata associated with each type of component included within the Web mashup. In one embodiment, at least two kinds of metadata are stored within each component description file: input/output format metadata and descriptive metadata. Input/output format metadata defines a specific set of input/output formats that can be used with a particular component type. Input/output format metadata may be used to ensure that data output from a first component for input to a second component is in a format that is compatible with the second component or to perform a conversion function when an incompatibility is detected. An example of incompatible input/output formats includes strings and arrays. Input/output format metadata may also be used for enforcing constraints (e.g., ensuring a value is within a range, is present when required, is non-zero, is positive, and/or many others), setting default values and the like.

Descriptive metadata may comprise data that is used by development environment 106 to provide high-level guidance to programming logic within development environment 106 and/or to a user about the kinds of things that a particular type of component is capable of doing. For example, descriptive metadata may include a list of operations that a particular type of component can perform, a brief description of code that may be used to automatically generate documentation, or a set of default values that development environment 106 will load when a particular type of component is called.

In one embodiment, the information stored in each component description file 126 is formatted in accordance with a markup language such as XML, although the invention is not so limited.

Component resources 128 comprise other resources, such as images, logos, or the like that may optionally be associated with a particular type of component. Such resources may be used, for example, to graphically represent a component type in a GUI provided by development environment 114.

The foregoing is merely an example of one development environment that may be used to develop a Web Mashup that may be executed in accordance with embodiments to be described herein. However, this example is not intended to be limiting and other development environments, including more code-driven development environments, may be used to develop the Web mashup.

2. Example Web Mashup Runtime Environment

Figure 2:
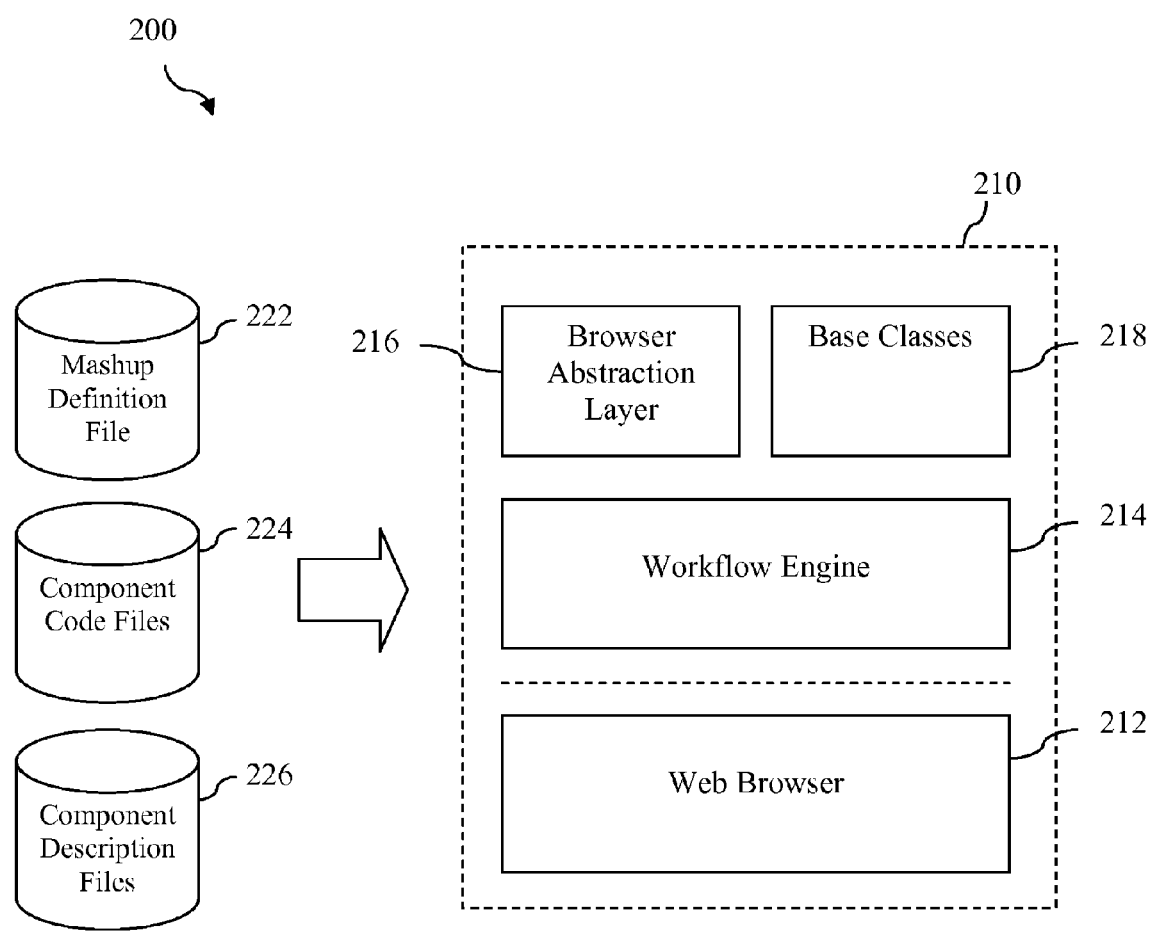
FIG. 2 is a block diagram of an example system for executing a Web mashup.

FIG. 2 depicts an example system 200 for executing a Web mashup. The Web mashup run by system 200 may comprise, for example, a Web mashup developed using system 100 of FIG. 1 as described above, although the invention is not so limited.

As shown in FIG. 2, system 200 includes a Web browser 212 executing on a client computer 210 and a workflow engine 214 hosted within Web browser 212. Like Web browser 112 described above in reference to FIG. 1, Web browser 212 comprises a software application that enables a user to display content and interact with applications that are accessible via the Internet or some other network and may comprise, for example, any commercially-available or publicly-available Web browser. Client computer 210 may comprise a personal computer or any other processor-based system or device capable of running a Web browser.

Workflow engine 214 represents programming logic that has been downloaded from a remote server by Web browser 212 for execution within the context of Web browser 212. Workflow engine 214 may comprise, for example, JavaScript programming logic, although the invention is not so limited. When executed, workflow engine 214 operates to execute a Web mashup in a manner that will be described in more detail herein. In one embodiment, workflow engine 214 comprises programming logic developed by Microsoft Corporation of Redmond, Wash., and made accessible to users via, for example, the Microsoft® Popfly™ Website (http://www.popfly.com), although the invention is not so limited.

As further shown in FIG. 2, system 200 also includes a browser abstraction layer 216 and base classes 218. Similar to browser abstraction layer 116 described above in reference to FIG. 1, browser abstraction layer 216 comprises programming logic that interprets function calls generated by workflow engine 214 such that the function calls are received in a format that is suitable for execution by Web browser 212. Like base classes 118 described above in reference to FIG. 1, base classes 218 comprise functions that may be called by workflow engine 214 to perform certain useful operations such as, for example, making Web requests or processing strings or arrays.

To execute a Web mashup, certain inputs must be provided to workflow engine 214. As shown in FIG. 2, these inputs include at least a mashup definition file 222, component code files 224 and component description files 226. These files are analogous to mashup definition file 122, component code files 124 and component description files 126 as described above in reference to FIG. 1. As will be described in more detail herein, workflow engine 214 obtains these files from a remote server as part of the process of executing the Web mashup.

3. Example Method for Web Mashup Execution

The manner in which system 200 executes a Web mashup will now be described in detail with reference to flowchart 300 of FIG. 3. Although the method of flowchart 300 will be described herein in reference to the elements of system 200, the method is not limited to that embodiment.

Figure 3:
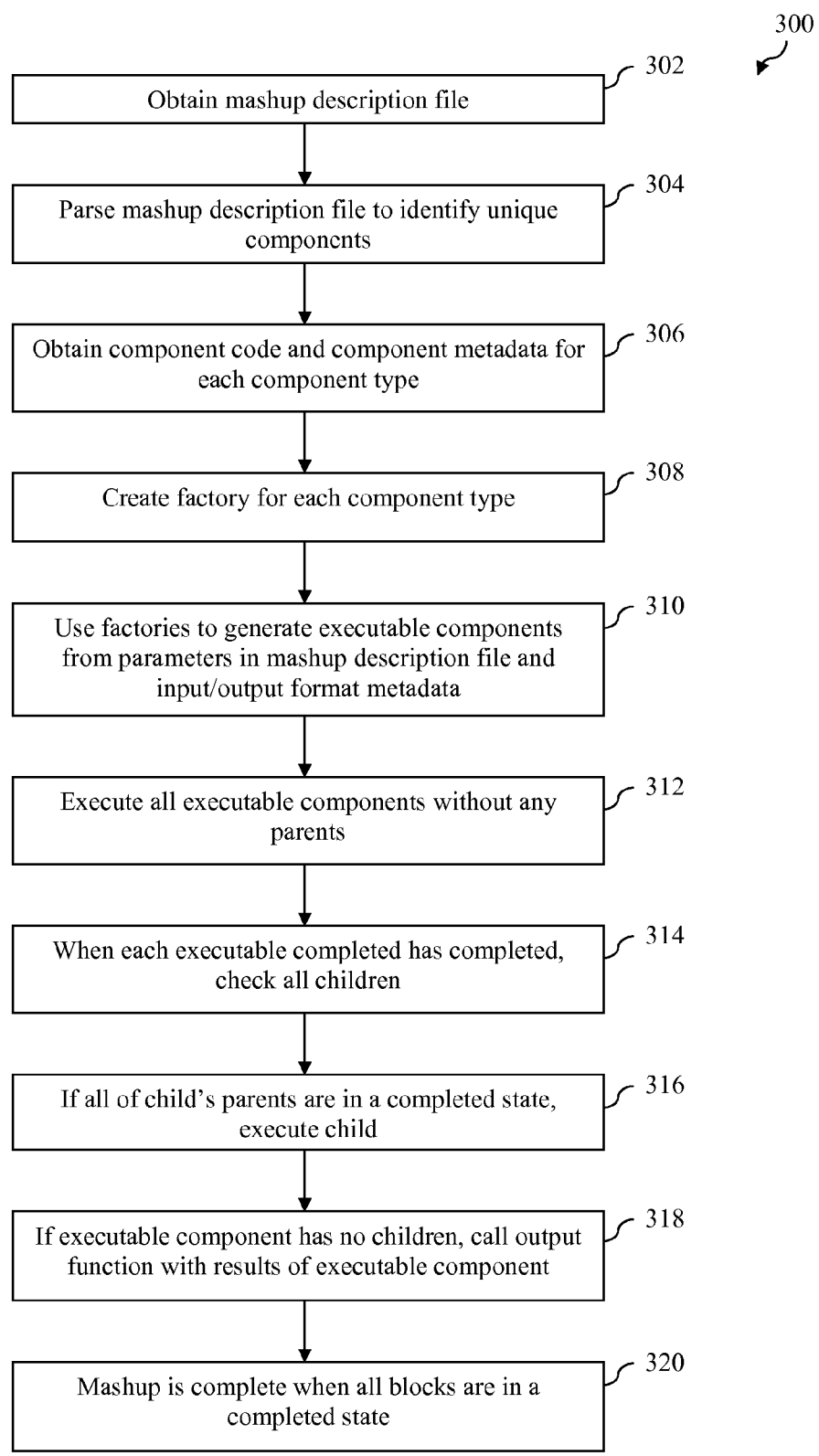
FIG. 3 depicts a flowchart of a method for executing a Web mashup.

As shown in FIG. 3, the method of flowchart 300 begins at step 302 in which workflow engine 214 executing within the context of Web browser 212 obtains mashup definition file 222. This step may encompass passing a request for mashup definition file 222 from workflow engine 214 to a remote server and receiving the file back from the remote server after the request has been processed. The mashup definition file may be received and loaded as an object by the workflow engine. Although reference is made herein to a "mashup definition file," persons skilled in the relevant art(s) will appreciate that, depending upon the implementation, a mashup definition may be obtained by workflow engine 214 in a form other than a file (e.g., as a stream of information or in some other form).

At step 304, workflow engine 214 parses mashup definition file 222 to identify unique components within the file. As noted above, a component may be thought of as a distinct unit of execution within the Web mashup. In addition to identifying unique components within mashup definition file 222, step 304 may also include parsing mashup definition file 222 to identify content dependencies between identified components. A content dependency exists when a first component requires as input data that is output from one or more other components. Step 304 may further include parsing mashup definition file 222 to identify certain parameters that will be used to generate an executable version of each component. Such parameters may include, for example, an operation to be performed by a component, one or more values to be input to a component and one or more properties relating to how output is to be presented to a user by a component.

At step 306, for each type of component identified in step 304, workflow engine 214 obtains component code and component metadata. As discussed above, in an embodiment of the present invention, multiple components may each be based on the same basic component type. Thus, although multiple components may be identified in step 304, a plurality of the identified components may be associated with only a single component type.

Component code is obtained by loading a component code file 224 associated with each component type while component metadata is obtained by loading a component description file 226 associated with each component type. Thus, this step may encompass passing a request for component code files 224 and component description files 226 from workflow engine 214 to a remote server and receiving the appropriate files back from the remote server after the request has been processed. Depending upon the implementation, the request may comprise a single request or multiple requests. Also, although reference is made herein to "component code files" and "component description files," persons skilled in the relevant art(s) will readily appreciate that, depending upon the implementation, component code and component metadata may be obtained by workflow engine 214 in a form other than a file (e.g., as a stream of information or in some other form).

At step 308, workflow engine 214 creates a factory for each component type. In an embodiment, creating a factory for a component type comprises creating or configuring programming logic that is capable of generating one or more executable components based on a component type.

At step 310, workflow engine 214 uses each factory created in step 308 to generate executable components corresponding to the components identified in step 304. In one embodiment, generation of an executable component includes modifying and or adding programming logic to the code associated with a basic component type to account for certain parameters associated with a component identified during step 304 as discussed above. Generation of an executable component may also include generating programming logic that formats data output from one executable component for input to another executable component in accordance with input/output format metadata associated with one or both components.

During steps 312, 314, 316 and 318, workflow engine 214 executes each of the executable components generated during step 310. In performing these steps, workflow engine 214 manages the order of execution of each of the executable components so that the Web mashup runs in an optimized and reliable fashion. For example, workflow engine 214 can initiate the execution of multiple executable components asynchronously, while also managing the execution sequence to ensure that content dependencies between the executable components are properly resolved. Details concerning each of these steps will now be provided.

At step 312, workflow engine 214 executes all executable components that do not have any parents. A parent of an executable component is any other executable component that outputs content that is used as input by the executable component. If an executable component does not have any parents, then it is not dependent on any other executable components for input and thus may be executed irrespective of the state of any other executable components. As discussed above, content dependencies between components may be determined by workflow engine 214 during step 304.

At shown at step 314, when the execution of an executable component has completed, workflow engine 214 checks each of the children of the executable component. A child of an executable component is any other executable component that uses as input content that is output by the executable component. As shown at step 316, if all of a child's parents are in a completed state, then workflow engine 214 executes the child. This is because all the content produced by the parents is available as input to the child. Otherwise, if even one of a child's parents is not in a completed state, the child remains pending in an unexecuted state.

As shown at step 318, if the execution of an executable component has completed and the component has no children, workflow engine 214 calls an output function with the results of the executable component. The output function may be, for example, a function that displays the results of the executable component in a certain format to a display area provided by Web browser 212.

As shown at step 320, once all of the executable blocks have executed and are in a completed state, execution of the Web mashup by workflow engine 214 is complete.

As noted above, workflow engine 214 is advantageously configured to manage the order of execution of each of the executable components in a Web mashup so that the Web mashup runs in an optimized and reliable fashion. To achieve optimized execution, workflow engine 214 is also configured to run certain executable components in an incremental fashion such that input to those executable components can be processed as soon as it becomes available. This aspect of workflow engine 214 will now be further described in reference to flowchart 400 of FIG. 4.

Figure 4:
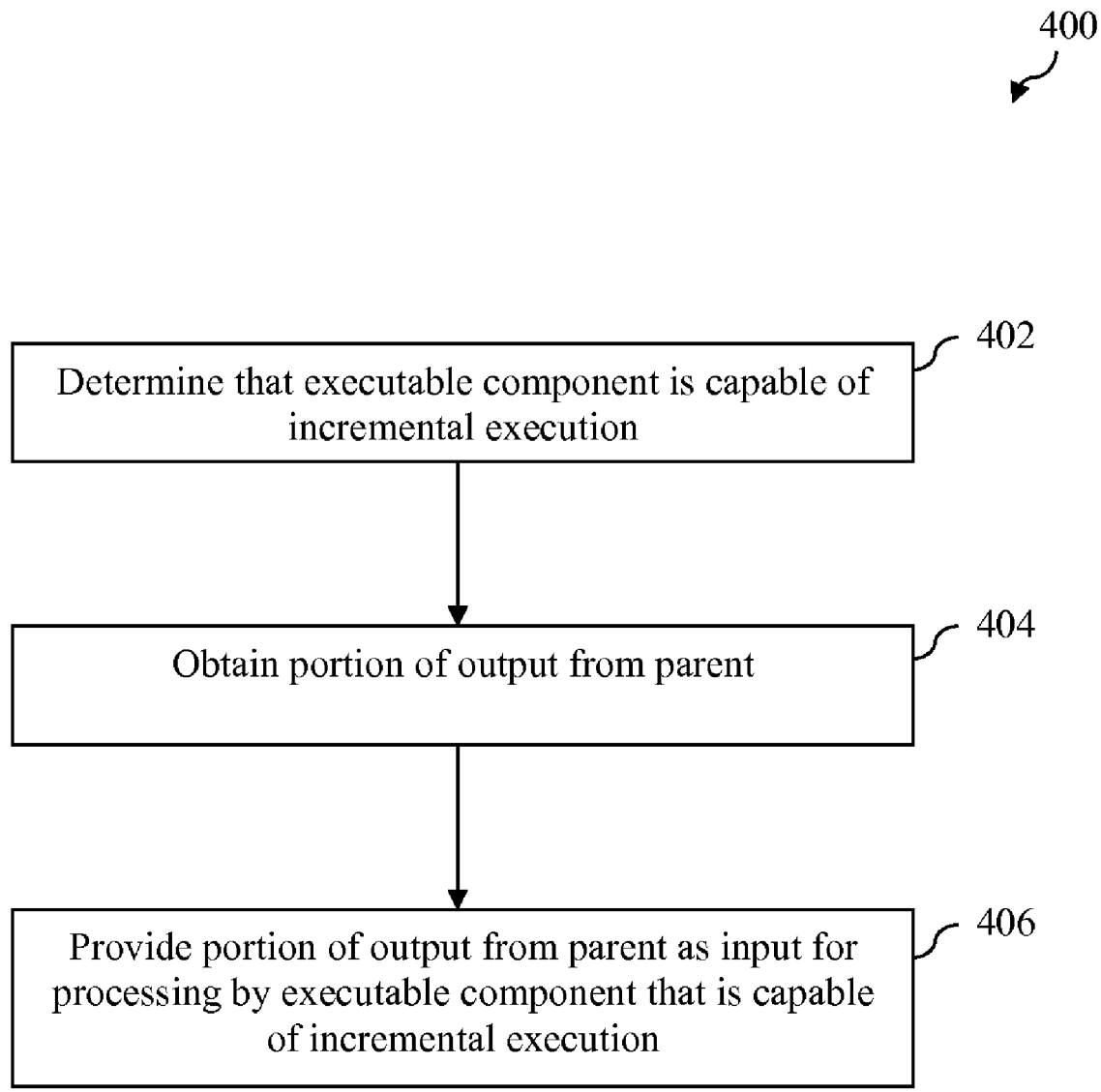
FIG. 4 depicts a flowchart of a method for incrementally executing a component within a Web mashup.

In particular, FIG. 4 depicts a flowchart 400 of a method for incrementally executing a component within a Web mashup in accordance with an embodiment of the present invention. Although the method of flowchart 400 will be described herein in reference to the elements of system 200, the method is not limited to that embodiment.

As shown in FIG. 4, the method of flowchart 400 begins at step 402 in which workflow engine 214 determines that an executable component is capable of being executed incrementally. An executable component is capable of being executed incrementally if it is capable of operating on only a portion of the total input expected by the executable component to produce some corresponding output or perform some corresponding function. An executable component may be capable of being executed incrementally, for example, if the executable component can operate on a row of expected input data instead of an entire array of expected input data. An executable component may be capable of being executed incrementally if it includes a call to a Web service that can be called incrementally. For example, an executable component that can be executed incrementally may include a call to a geocoding service that converts input locations to geographic coordinates, wherein the geocoding service can be called incrementally for each location received as input as opposed to placing a single call only when all input locations have been received.

Workflow engine 214 may determine that an executable component is capable of incremental execution based on information associated with the component in mashup definition file 222 or based on metadata associated with a corresponding component type.

At step 404, workflow engine 214 receives a portion of the output data that will be produced by a parent of the executable component. It is assumed for the purposes of this example that the portion of the output data produced by the parent comprises an incremental portion of data that can be processed by the executable component. Thus, with continued reference to the examples provided above, the output produced by the parent may include a single row in an array of input data or a location in a set of locations to be provided as input to a geocoding service.

At step 406, workflow engine 214 provides the portion of output data received from the parent as input for processing by the executable component that is capable of incremental execution. The executable component can then process the input in an incremental fashion. Thus, with continued reference to the examples provided above, the executable component can process a single row in an array of input data or single location in a set of locations to be provided as input to a geocoding service.

By incrementally executing components that are so capable, workflow engine 214 can advantageously increase the speed of execution of a Web mashup by mitigating the effects of components that produce data for downstream consumption by other components in a slow and/or intermittent fashion.

Figure 5:
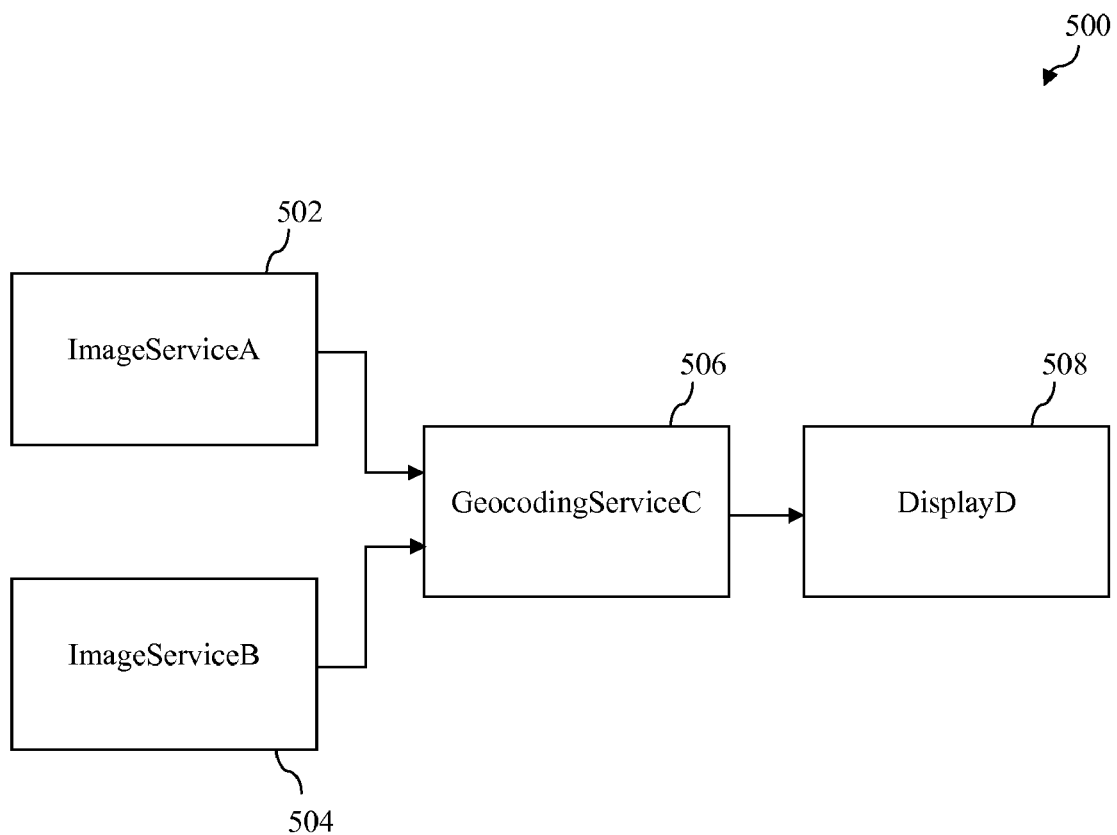
FIG. 5 depicts an example of a Web mashup comprising a plurality of components.

To illustrate some of the advantages of the foregoing methods, FIG. 5 depicts an example Web mashup 500 comprising a plurality of executable components that may be executed by a workflow engine in accordance with an embodiment of the present invention. As shown in FIG. 5, Web mashup 500 comprises an executable component 502 that obtains content from a Web service denoted ImageServiceA, an executable component 504 that obtains content from a Web service denoted ImageServiceB, an executable component 506 that provides content (e.g., location information) from executable components 502 and 504 to a Web service denoted GeocodingServiceC and obtains corresponding content (e.g., geographic coordinates) therefrom, and an executable component 508 that performs a display function denoted DisplayD based on the content obtained from executable component 506 (e.g., placing pushpins on a map based on the geographic coordinates returned from executable component 506).

In accordance with the foregoing methods, workflow engine 214 can initiate execution of executable components 502 and 504 simultaneously since neither component is dependent on another component for input. Furthermore, assuming that executable component 506 is capable of incremental execution, workflow engine 214 can incrementally and individually pipeline output from executable components 502 and 504 through executable component 506, irrespective of the progress of either executable component 502 or 504. Any output produced by executable component 506 can immediately be processed for display by executable component 508.

C. Cross-Domain Communication Technique for Execution of Web Mashups

This section describes a cross-domain communication technique used by an embodiment of the present invention to fetch data from third-party Web services for use by a Web mashup executing within the context of a Web browser. The technique described herein ensures that requests to the third-party Web services are communicated in a manner that does not violate the Same Origin Policy (SOP) observed by many Web browsers.

Figure 6:
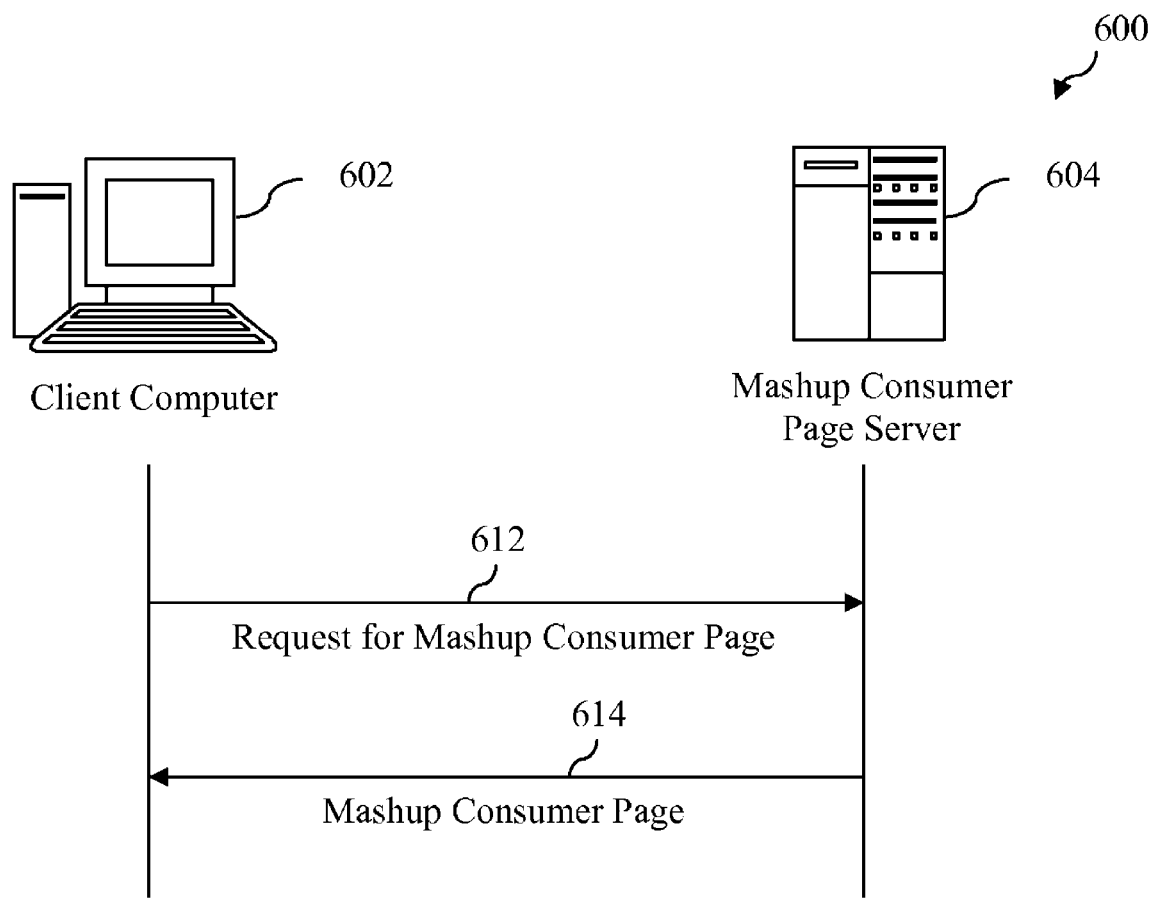
FIG. 6 is a diagram that depicts a manner in which a mashup consumer page is delivered from a mashup consumer page server to a client computer.

A Web mashup may be embedded in a Web page, referred to herein as a mashup consumer page, and executed when the mashup consumer page is delivered to a Web browser. FIG. 6 depicts a diagram 600 of one manner by which a mashup consumer page may be delivered to a Web browser. As shown in diagram 600, a Web browser executing on a client computer 602 sends a request for a mashup consumer page 612 to a mashup consumer page server 604 over the Internet or some other network. Responsive to the receipt of the request 612, mashup consumer page server 604 serves the mashup consumer page 614, which includes an embedded Web mashup, to the Web browser.

The mashup consumer page may be any Web page in which a Web mashup is embedded and may comprise, for example, a Web page within a social networking site, a blog, or some other type of Web page. The Web mashup may be one that was developed using tools developed by Microsoft Corporation of Redmond, Wash., and made accessible to users via the Microsoft® Popfly™ Website (http://www.popfly.com), although the invention is not so limited. Embedding the Web mashup within the mashup consumer page may comprise actually inserting HTML (HyperText Markup Language) within the page or running an application that embeds the Web mashup within the page.

Figure 7:
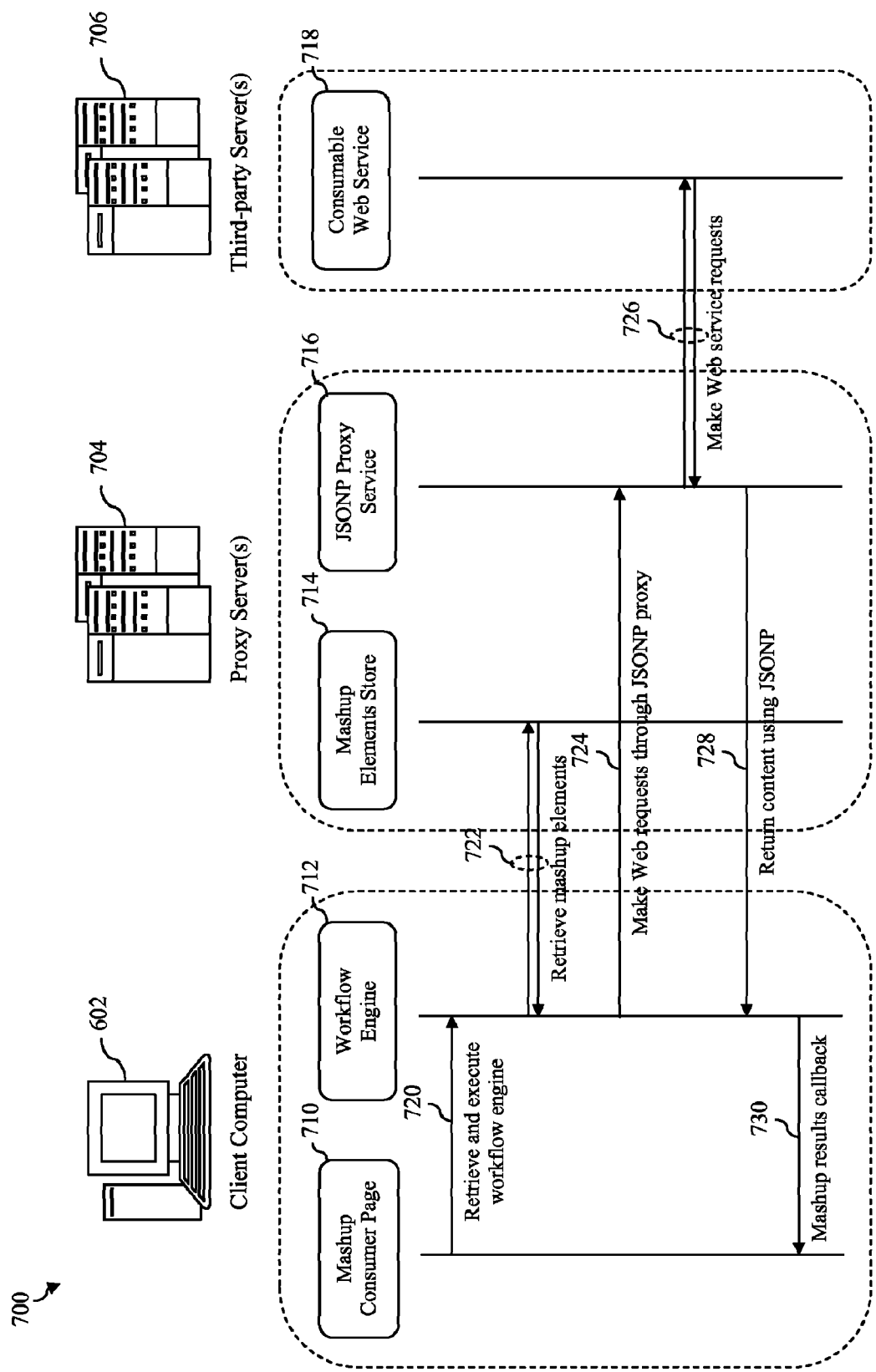
FIG. 7 is a diagram that depicts a cross-domain communication technique for executing a Web mashup in accordance with an embodiment of the present invention.

Once the mashup consumer page has been delivered to the Web browser, the Web mashup embedded in the mashup consumer page will execute in a manner that will now be described in reference to diagram 700 of FIG. 7. In particular, FIG. 7 shows communications occurring between entities in a system that includes client computer 602 (introduced above in reference to FIG. 6), one or more proxy servers 704, and one or more third-party servers 706. Client computer 602 is communicatively connected to proxy server(s) 704 via the Internet or some other network. Likewise, proxy server(s) 704 are communicatively connected to third-party server(s) 706 via the Internet or some other network.

As shown in FIG. 7, after a mashup consumer page 710 has been delivered to the Web browser running on client computer 602, the loading of the page results in the retrieval and execution 720 of a workflow engine 712. Workflow engine 712 may comprise a workflow engine such as that described above in Section B. Workflow engine 712 may already be present on client computer 602 or may be dynamically loaded by the Web browser when the mashup consumer page is loaded.

When workflow engine 712 executes, it operates in a manner described above in Section B to obtain a mashup description file associated with the Web mashup embedded in mashup consumer page 710, to parse the mashup description file to identify unique components therein, and to obtain component code and component metadata for each component type identified in the mashup description file. As shown in FIG. 7, workflow engine 712 requests and receives 722 the mashup description file, the component code and the component metadata from a mashup elements store 714 maintained by proxy server(s) 704. In one embodiment, workflow engine 712 retrieves these elements using the JSONP (Javascript Object Notation with Padding) methodology for cross-domain data fetching, although the invention is not so limited. As will be appreciated by persons skilled in the relevant art(s), this methodology involves the generation of HTML <script> tags to make cross-domain calls and the receipt of results in the form of an executable callback function that has as its argument the requested data.

After workflow engine 712 has obtained the necessary component code and component metadata, it creates a factory for each component type, uses the factories to generate executable components and then manages the execution of the executable components in a manner previously described in Section B. When executed, an executable component may generate a Web request to a third-party Web service hosted by third-party servers 706. When a Web request is generated by an executable component, workflow engine 712 transparently redirects the Web service request to a JSONP proxy service 716 running on proxy server(s) 704, which acts an intermediate between workflow engine 712 and the third-party Web service.

In one embodiment, workflow engine 712 performs this function by receiving the Web request and, responsive to receiving the Web request, placing a JSONP cross-domain call to JSONP proxy service 716. This may involve generating an HTML <script> tag with a source attribute set to a URL associated with JSONP proxy service 716 followed by a query string that includes certain information necessary for retrieving and returning data from the third-party Web service. Such information may include a URL or other identifier of the third party Web-service, parameters needed to place a call to the particular third-party Web service (e.g., a name of the operation being called, input to the operation, and the like), and a callback function to be used in returning the requested data. The placement of the Web request in this manner to JSONP proxy service 716 is denoted with reference numeral 724 in FIG. 7.

Upon receipt of the JSONP cross-domain call from workflow engine 712, JSONP proxy service 716 generates a Web service request to the appropriate consumable third-party Web service 718 hosted on third-party server(s) 706. JSONP proxy service 716 may generate the Web service request based on certain query string information included in the JSONP cross-domain call, such as that described in the preceding paragraph. The generated Web service request is then transmitted to consumable Web service 718 and, responsive to receiving the Web service request, consumable Web service 718 returns content to JSONP proxy service 718. This exchange is denoted with reference numeral 726 in FIG. 7. It is noted that, because the Web service request transmitted from JSONP proxy service 716 to consumable Web service 718 is a server request, it is not subject to SOP.

After receiving the requested content, JSONP proxy service 716 returns the content 728 to workflow engine 712. In one embodiment, JSONP proxy service 716 performs this function by encapsulating the content within a callback function that is then passed back to workflow engine 712 in accordance with JSONP methodology. As noted above, the name of the callback function may have been specified as part of the query string information included in the original JSONP cross-domain call from workflow engine 712.

Upon receipt of the callback function, workflow engine 712 executes the callback function 730. Execution of the callback function causes a call to be placed to the executing component that originally generated the Web service request so that the executing component can identify and process the returned content. In one embodiment, callback functions for an executable component are generated when the executable component is itself generated, as described in Section B above.

Although the foregoing describes the use of a callback function to pass content from JSONP proxy service 716 to workflow engine 712, person(s) skilled in the relevant art will readily appreciate that other types of callbacks, including but not limited to events or properties, may be used to pass such content and that the invention is not limited to the use of callback functions only.

The foregoing cross-domain communication technique for executing a Web mashup in accordance with an embodiment of the present invention provides a number of benefits. For example, since workflow engine 712 performs the functions necessary for redirecting Web requests generated by executing Web mashup components to JSONP proxy service 716, a developer of the Web mashup components need not be concerned about implementing such functions. This makes development of Web mashup components easier. Furthermore, since the foregoing technique utilizes JSONP for communicating between workflow engine 712 and the elements on proxy server(s) 704, the technique allows Web mashup content to be embedded in and integrated with other elements of a Web page in a manner that does not violate the Same Origin Policy observed by many Web browsers. Finally, by providing JSONP proxy service 716, an embodiment of the present invention advantageously provides a JSONP interface to third-party Web services that don't expose such an interface.

D. Example Computer System Implementation

Figure 8:
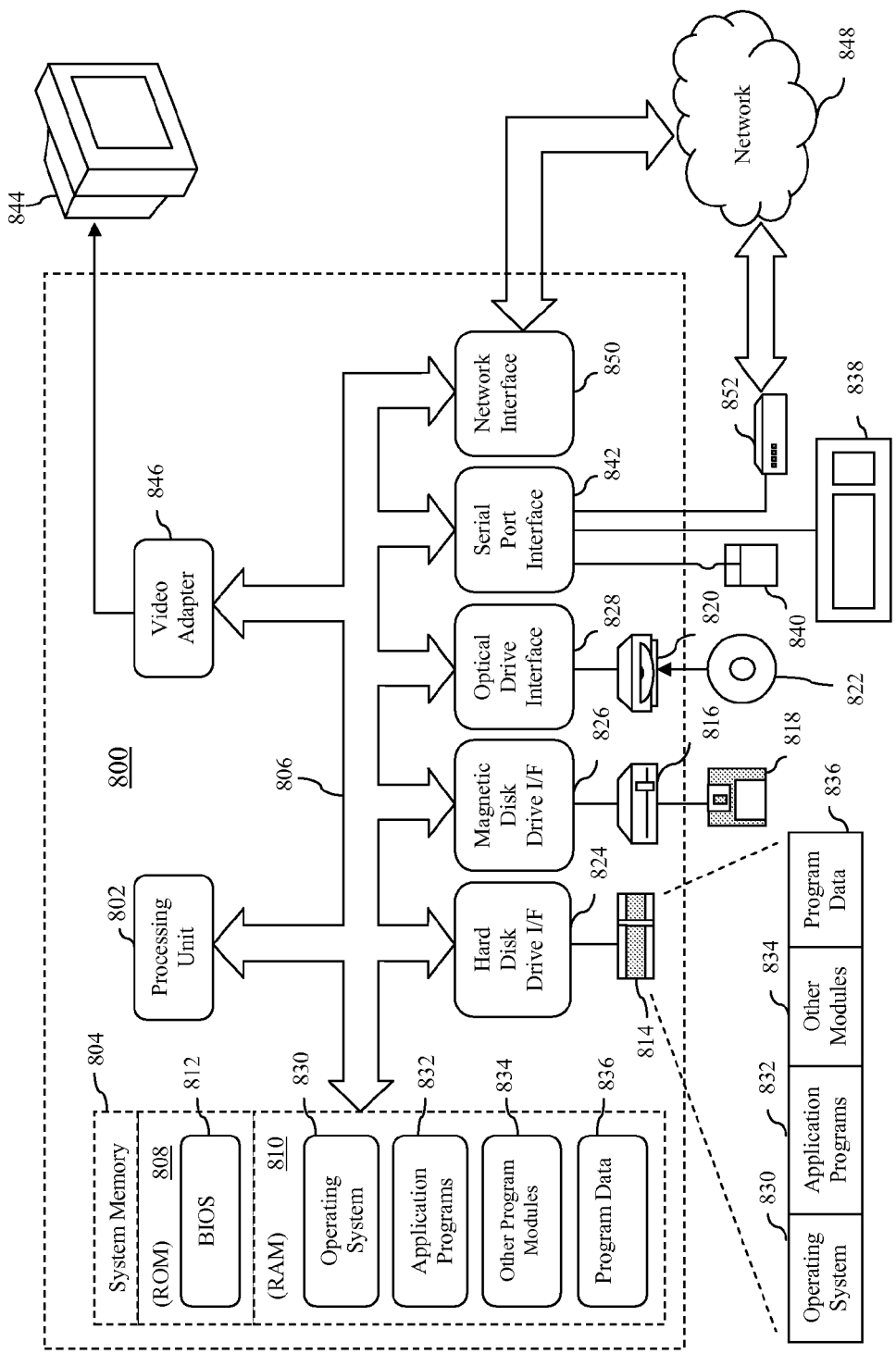
FIG. 8 depicts an example computer system that may be used to implement the present invention.

FIG. 8 depicts an exemplary implementation of a computer system 800 upon which various aspects of the present invention may be executed. Computer system 800 is intended to represent a general-purpose computing system in the form of a conventional personal computer.

As shown in FIG. 8, computer system 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer system 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, any of the various software-implemented elements or functions depicted in FIGS. 1 and 2. Application programs 832 or program modules 834 may also include, for example, logic for implementing one or more of the steps of the flowcharts depicted in FIGS. 3 and 4 or one or more of the functions depicted in the diagrams of FIGS. 6 and 7. Thus each step or function illustrated in those figures may also be thought of as program logic configured to perform the function described by that step.

A user may enter commands and information into computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A monitor 844 or other type of display device is also connected to bus 806 via an interface, such as a video adapter 846. Monitor 844 is used to present a GUI that assists a user/operator in configuring and controlling computer 800. In addition to the monitor, computer 800 may include other peripheral output devices (not shown) such as speakers and printers.

Computer 800 is connected to a network 848 (e.g., a WAN such as the Internet or a LAN) through a network interface 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like.

As noted above, computer programs (including application programs 832 and other program modules 834) may be stored on the hard disk, magnetic disk, optical disk, ROM, or RAM. Such computer programs may also be received via network interface 850 or serial port interface 842. Such computer programs, when executed, enable computer 800 to implement features of the present invention discussed herein. Accordingly, such computer programs represent controllers of computer 800.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for communicating requests from a Web mashup being executed within the context of a Web browser to a third-party Web service that does not support cross-domain calls from the Web browser in a manner that does not violate a Same Origin Policy observed by the Web browser, comprising:

receiving in a workflow engine running in the context of the Web browser a first Web service request to the third-party Web service generated by the Web mashup;

responsive to receiving the first Web service request, generating in the workflow engine a cross-domain call to a proxy server that does support cross-domain calls from the Web browser and is not subject to the Same Origin Policy, wherein the cross-domain call includes information to be used by the proxy server in placing a second Web service request to the third-party Web service, and issuing the cross-domain call from the workflow engine to the proxy server; and receiving in the workflow engine a callback from the proxy server that includes content returned from the third-party Web service responsive to the placement of the second Web service request by the proxy server; and processing the callback in the workflow engine to deliver the content returned from the third-party Web service to the Web mashup.

2. The method of claim 1, wherein receiving in the workflow engine a callback from the proxy server comprises receiving in the workflow engine a callback function from the proxy server that includes as an argument the content returned from the third-party Web service; and wherein processing the callback in the workflow engine comprises executing the callback function in the workflow engine.

3. The method of claim 2, wherein the Web mashup comprises a plurality of executable components, wherein receiving the first Web service request generated by the Web mashup comprises receiving a first Web service request generated during execution of one of the executable components, and wherein receiving the callback function comprises receiving a callback function to the one of the of the executable components.

4. The method of claim 1, wherein issuing a cross-domain call comprises issuing a Javascript Object Notation with Padding (JSONP) cross-domain call.

5. The method of claim 1, wherein the information included within the cross-domain call that is to be used by the proxy server in placing the second Web service request to the third-party Web service comprises:

an identifier of the third-party Web service.

6. The method of claim 1, wherein the information included within the cross-domain call that is to be used by the proxy server in placing the second Web service request to the third-party Web service comprises one or more of:

a name of an operation to be performed by the third-party Web service; and input data to be provided to an operation to be performed by the third-party Web service.

7. The method of claim 2, wherein the information included within the cross-domain call further includes:

a name of the callback function.

8. A computer program product comprising a computer-readable storage device having computer program logic recorded thereon for enabling a processing unit to communicate requests from a Web mashup being executed within the context of a Web browser to a third-party Web service that does not support cross-domain calls from the Web browser in a manner that does not violate a Same Origin Policy observed by the Web browser, the computer program logic comprising:

first means for enabling the processing unit to receive a first Web service request to the third-party Web service generated by the Web mashup;

second means for enabling the processing unit to generate a cross-domain call to a proxy server that supports cross-domain calls from the Web-browser and is not subject to the Same Origin Policy, wherein the cross-domain call includes information to be used by the proxy server in placing a second Web service request to the third-party Web service, and to issue the cross-domain call to the proxy server responsive to receiving the first Web service request;

third means for enabling the processing unit to receive a callback from the proxy server that includes content returned from the third-party Web service responsive to the placement of the second Web service request by the proxy server; and fourth means for enabling the processing unit to process the callback to deliver the content returned from the third-party Web service to the Web mashup.

9. The computer program product of claim 8, wherein the third means comprises means for enabling the processing unit to receive a callback function from the proxy server that includes as an argument the content returned from the third-party Web service; and wherein the fourth means comprises means for enabling the processing unit to execute the callback function to deliver the content returned from the third-party Web service to the Web mashup.

10. The computer program product of claim 9, wherein the Web mashup comprises a plurality of executable components, wherein the first means comprises means for enabling the processing unit to receive a first Web service request generated during execution of one of the executable components, and wherein the third means comprises means for enabling the processing unit to receive a callback function to the one of the of the executable components.

11. The computer program product of claim 8, wherein the second means comprises means for enabling the processing unit to issue a Javascript Object Notation with Padding (JSONP) cross-domain call.

12. The computer program product of claim 8, wherein the information included within the cross-domain call that is to be used by the proxy server in placing the second Web service request to the third-party Web service comprises:
   an identifier of the third-party Web service.

13. The computer program product of claim 8, wherein the information included within the cross-domain call that is to be used by the proxy server in placing the second Web service request to the third-party Web service comprises one or more of:
   a name of an operation to be performed by the third-party Web service; and
   input data to be provided to an operation to be performed by the third-party Web service.

14. The computer program product of claim 9, wherein the information included within the cross-domain call further includes:
   a name of the callback function.

15. A method for communicating requests from a Web mashup being executed within the context of a Web browser to a third-party Web service that does not support cross-domain calls from the Web browser in a manner that does not violate a Same Origin Policy observed by the Web browser, comprising:
   receiving in a proxy server that supports cross-domain calls from the Web browser and is not subject to the Same Origin Policy a cross-domain call from a workflow engine running in the context of the Web browser, wherein the cross-domain call was issued by the workflow engine responsive to receiving a first Web service request generated by the Web mashup;
   responsive to receiving the cross-domain call, generating in the proxy server a second Web service request to the third-party Web server based on information included within the cross-domain call and placing the second Web service request to the third-party Web service;
   receiving content returned from the third-party Web service responsive to the placement of the second Web service request by the proxy server; and
   returning from the proxy server to the workflow engine a callback that includes the content returned from the third-party Web service.

16. The method of claim 15, wherein receiving a cross-domain call comprises receiving a Javascript Object Notation with Padding (JSONP) cross-domain call.

17. The method of claim 15, wherein the information included within the cross-domain call comprises:
   an identifier of the third-party Web service.

18. The method of claim 15, wherein the information included within the cross-domain call comprises one or more of:
   a name of an operation to be performed by the third-party Web service; and
   input data to be provided to an operation to be performed by the third-party Web service.

19. The method of claim 15, wherein returning from the proxy server to the workflow engine a callback that includes the content returned from the third-party Web service comprises:
   returning from the proxy server to the workflow engine a callback function that includes as an argument the content returned from the third-party Web service.

20. The method of claim 19, wherein the information included within the cross-domain call further includes:
   a name of the callback function.

* * * * *